(12) United States Patent
Zheng et al.

(10) Patent No.: US 12,352,876 B2
(45) Date of Patent: Jul. 8, 2025

(54) METHOD FOR POSITIONING STATE INFORMATION REPORT

(71) Applicant: ZTE Corporation, Guangdong (CN)

(72) Inventors: Guozeng Zheng, Guangdong (CN); Huahua Xiao, Guangdong (CN); Chuangxin Jiang, Guangdong (CN); Hao Wu, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 385 days.

(21) Appl. No.: 17/851,798

(22) Filed: Jun. 28, 2022

(65) Prior Publication Data

US 2022/0326337 A1    Oct. 13, 2022

Related U.S. Application Data

(63) Continuation of application No. PCT/CN2020/107988, filed on Aug. 7, 2020.

(51) Int. Cl.
*G01S 5/02*    (2010.01)
*H04W 64/00*    (2009.01)

(52) U.S. Cl.
CPC .......... *G01S 5/0221* (2013.01); *H04W 64/00* (2013.01)

(58) Field of Classification Search
CPC .... G01S 5/0027; G01S 5/0036; G01S 5/0221; H04W 24/10; H04W 64/00
See application file for complete search history.

(56) References Cited

U.S. PATENT DOCUMENTS

| | | | | |
|---|---|---|---|---|
| 2015/0024775 | A1* | 1/2015 | Jung | .......... H04W 64/003 |
| | | | | 455/456.1 |
| 2017/0366244 | A1 | 12/2017 | Lee et al. | |
| 2021/0282111 | A1* | 9/2021 | Yamada | .......... G01S 5/10 |
| 2021/0314904 | A1* | 10/2021 | Duan | .......... G01S 5/0268 |

FOREIGN PATENT DOCUMENTS

| | | |
|---|---|---|
| CN | 108886386 A | 11/2018 |
| CN | 111314952 A | 6/2020 |
| EP | 3 648 496 A | 5/2020 |
| WO | WO 2015/096074 A1 | 7/2015 |
| WO | WO 2020/003896 A1 | 1/2020 |
| WO | WO 2020/016975 A1 | 1/2020 |

OTHER PUBLICATIONS

International Search Report and Written Opinion received for Application No. PCT/CN2020/107988 mailed Apr. 20, 2021 (8 pages).
First Office Action issued for China Patent Application No. 202080104381.1 dated Dec. 20, 2024 (26 pp.).

* cited by examiner

*Primary Examiner* — Nader Bolourchi
(74) *Attorney, Agent, or Firm* — Crowell & Moring LLP

(57) ABSTRACT

A wireless communication method for use in a wireless terminal is disclosed. The wireless communication method comprises transmitting, to a wireless network node, positioning state information in a physical uplink channel.

20 Claims, 5 Drawing Sheets

Transmit, to a wireless network node, positioning state information in a physical uplink channel — 500

FIG. 5

Receive, from a wireless terminal, positioning state information in a physical uplink channel — 600

FIG. 6

METHOD FOR POSITIONING STATE INFORMATION REPORT

PRIORITY

This application claims priority as a Continuation of PCT/CN2020/107988, filed on Aug. 7, 2020, entitled "METHOD FOR POSITIONING STATE INFORMATION REPORT", published as WO 2022/027670 A1, the entirety of which is incorporated herein by reference.

TECHNICAL FIELD

This document is directed generally to wireless communications.

BACKGROUND there are some disadvantages in the current design of the positioning state information report. For example, frequent signaling interaction between UE and LMF, large latency for the positioning information report and/or that the UE can only report position estimation or measurement results to the core network entity.

SUMMARY

In general, this document relates to methods, systems, and devices for positioning state information report.

This document relates to methods, systems, and devices for reporting positioning state information, and in particularly to methods, systems, and devices for reporting positioning state information in a physical uplink channel.

The present disclosure relates to a wireless communication method for use in a wireless terminal, the wireless communication method comprising:

transmitting, to a wireless network node, positioning state information in a physical uplink channel.

Various embodiments may implement the following features:

In some embodiments, the physical uplink channel comprises at least one of a physical uplink control channel or a physical uplink shared channel, and the positioning state information comprises at least one of:

a latitude of the wireless terminal,
a longitude of the wireless terminal,
an altitude of the wireless terminal,
an uncertainty region of the wireless terminal,
a confidence level of the uncertainty region,
a relative position between the wireless terminal and a reference point,
a horizontal velocity of the wireless terminal,
a vertical velocity of the wireless terminal, or
an uncertainty of a velocity associated to at least one of the horizontal velocity or the vertical velocity.

In some embodiments, the physical uplink channel comprises a physical uplink shared channel and the positioning state information comprises a positioning state information report comprising measurement results.

In some embodiments, the measurement results are associated with at least one of a main positioning measurement or at least one additional positioning measurement.

In some embodiments, the measurement results associated with the main positioning measurement or the at least one additional positioning measurement comprises at least one of:

positioning node identification information, associated with at least one position node of the corresponding positioning measurement, reference signal index information, associated with at least one reference signal used for the corresponding positioning measurement, a time stamp of the corresponding positioning measurement, positioning measurement information, comprising at least one of a downlink positioning reference signal reference signal received power, a downlink reference signal time difference, or a user equipment reception-transmission time difference, a measurement quality of the corresponding positioning measurement, additional path information, associated with at least one additional path of receiving the at least one reference signal used for the corresponding positioning measurement, or beam information, associated with at least one beam of receiving the at least one reference signal used for the corresponding positioning measurement.

In some embodiments, the positioning state information report comprises: a first part, with a fixed bit width and comprising an indication of report contents comprised in the positioning state information report, and a second part, comprising at least one sub-part in which the measurement results of at least one of the main positioning measurement or at least one additional positioning measurement are comprised.

In some embodiments, the indication of the report contents comprises at least one of:

the number of position nodes associated with the positioning state information report, the number of additional paths associated with the positioning state information report, the number of the at least one additional measurement, an indication of whether the positioning state information report comprises measurement quality, an indication of whether the positioning state information report comprises a time stamp associated with the positioning state information report, or an indication of whether the positioning state information report comprises reception beam information.

In some embodiments, the wireless communication method further comprises:

receiving, from the wireless network node, a signaling of triggering reporting the positioning state information, and stopping or deprioritizing processing channel state information.

In some embodiments, the wireless communication method further comprises configuring processing resources of the wireless terminal based on a configuration of reporting the positioning state information, wherein the configuration comprises at least one of the number of positioning nodes associated with reporting the positioning state information or the number of positioning reference signals associated with reporting the positioning state information.

In some embodiments, the positioning state information is associated with at least one positioning node and the wireless communication method further comprises processing the positioning state information associated with a part of the at least one positioning node based on priority of each positioning node.

In some embodiments, the positioning state information is associated with at least one reference signal and the wireless communication method further comprises processing the positioning state information associated with a part of the at least one reference signal based on priority of each reference signal.

In some embodiments, the positioning state information and channel state information are configured in the same channel and the position state information is prioritized.

In some embodiments, the positioning state information comprises a positioning state information report comprising a first part and a second part which comprises at least one sub-part and a mapping priority of the first part and the at least one sub-part from high priority to low priority is the first part followed by the first sub-part in the at least one sub-part to the last sub-part in the at least one sub-part.

In some embodiments, the positioning state information comprises a positioning state information report comprising a first part and a second part which comprises at least one sub-part, and at least one of the at least one sub-part is omitted in an ascending order from the last sub-part in the at least one sub-part to the first sub-part in the at least one sub-part.

In some embodiments, a time gap between a first time and a second time of transmitting the positioning state information is greater than a threshold, wherein the first time is one of a reception time of receiving the last reference signal associated with the positioning state information or an end time of a measurement gap in which the last reference signal associated with the positioning state information is received.

In some embodiments, at least one downlink reference signal and at least one uplink reference signal used for measuring a user equipment reception-transmission time difference in the positioning state information is activated by the same media access control control element or triggered by the same downlink control information.

The present disclosure relates to a wireless communication method for use in a wireless network node. The wireless communication method comprises receiving, from a wireless terminal, positioning state information in a physical uplink channel.

Various embodiments may implement the following features:

In some embodiments, the physical uplink channel comprises at least one of a physical uplink control channel or a physical uplink shared channel, and the positioning state information comprises at least one of:

a latitude of the wireless terminal,
a longitude of the wireless terminal,
an altitude of the wireless terminal,
an uncertainty region of the wireless terminal,
a confidence level of the uncertainty region,
a relative position between the wireless terminal and a reference point,
a horizontal velocity of the wireless terminal,
a vertical velocity of the wireless terminal, or
an uncertainty of a velocity associated with at least one of the horizontal velocity or the vertical velocity.

In some embodiments, the physical uplink channel comprises a physical uplink shared channel and the positioning state information comprises a positioning state information report comprising measurement results.

In some embodiments, the measurement results are associated with at least one of a main positioning measurement or at least one additional positioning measurement.

In some embodiments, the measurement results associated with the main positioning measurement or the at least one additional positioning measurement comprises at least one of:

positioning node identification information, associated with at least one position node of the corresponding positioning measurement, reference signal index information, associated with at least one reference signal used for the corresponding positioning measurement, a time stamp of the corresponding positioning measurement, positioning measurement information, comprising at least one of a downlink positioning reference signal reference signal received power, a downlink reference signal time difference, or a user equipment reception-transmission time difference, a measurement quality of the corresponding positioning measurement, additional path information, associated with at least one additional path of receiving the at least one reference signal used for the corresponding positioning measurement, or beam information, associated with at least one beam of receiving the at least one reference signal used for the corresponding positioning measurement.

In some embodiments, the positioning state information report comprises: a first part, with a fixed bit width and comprising an indication of report contents comprised in the positioning state information report, and a second part, comprising at least one sub-part in which the measurement results of at least one of the main positioning measurement or at least one additional positioning measurement are comprised.

In some embodiments, the indication of the report contents comprises at least one of:

the number of position nodes associated with the positioning state information report, the number of additional paths associated with the positioning state information report, the number of the at least one additional measurement, an indication of whether the positioning state information report comprises measurement quality, an indication of whether the positioning state information report comprises a time stamp associated with the positioning state information report, or an indication of whether the positioning state information report comprises reception beam information.

In some embodiments, a time gap between a first time and a second time of transmitting the positioning state information is greater than a threshold, wherein the first time is one of a reception time of receiving the last reference signal associated with the positioning state information or an end time of a measurement gap in which the last reference signal associated with the positioning state information is received.

In some embodiments, at least one downlink reference signal and at least one uplink reference signal used for measuring a user equipment reception-transmission time difference in the positioning state information is activated by the same media access control element or triggered by the same downlink control information.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 5 shows a flowchart of a process according to an embodiment of the present disclosure.

FIG. 6 shows a flowchart of a process according to an embodiment of the present disclosure.

DETAILED DESCRIPTION

Figure 1:
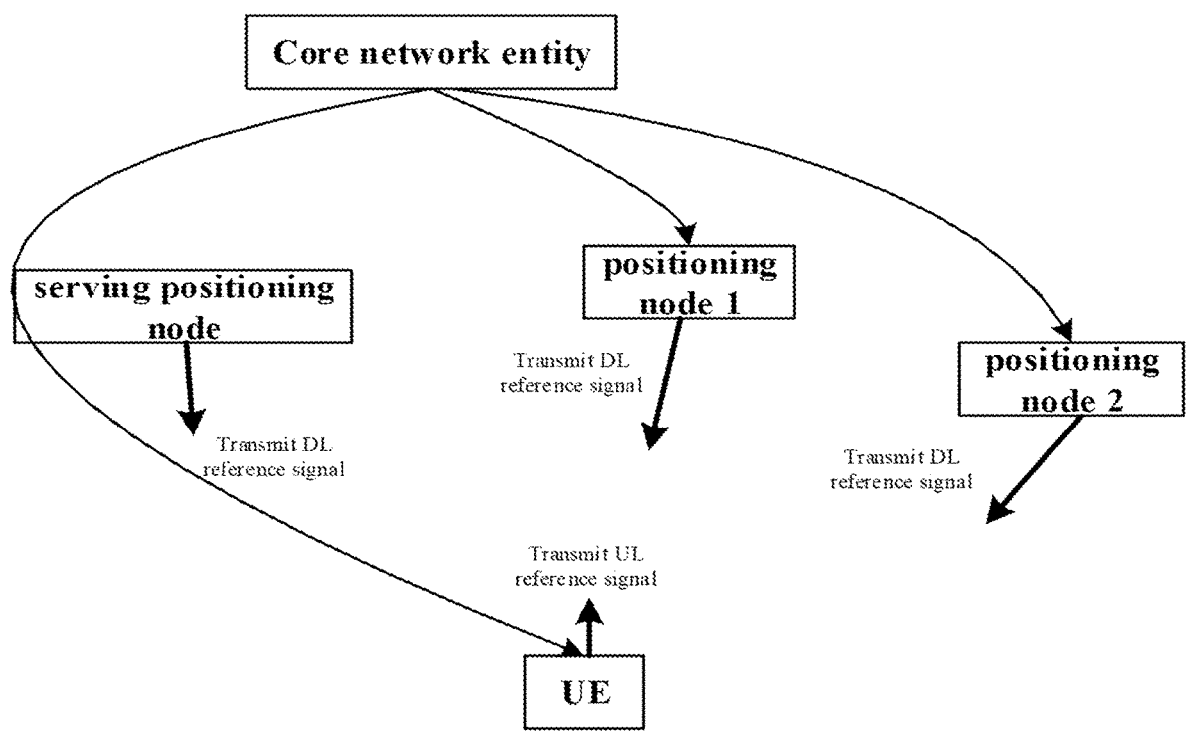
FIG. 1 illustrates procedures involved in positioning systems, positioning measurements and position estimate.

FIG. 1 illustrates procedures involved in positioning systems, positioning measurements and position estimate, which will be briefly outlined in the following. The DL PRS (downlink positioning reference signal) and measurement request are configured by the core network entity, i.e. Location Management Function (LMF) which is transmitted to UE (user equipment) and transparent to the serving positioning node. The serving positioning node and neighbor positioning nodes will also be informed about the DL PRS configuration, which should be transmitted by corresponding positioning nodes. Subsequently, the UE receives DL PRS(s) as configured by LMF. The UE then transmits UL RS(s) as configured by the serving positioning node. Next, the UE conducts position estimation and/or measurement results based on reference signals. Finally, the UE reports the position estimation and/or measurement results to the core network entity, which is transparent to the serving positioning node.

Figure 2:
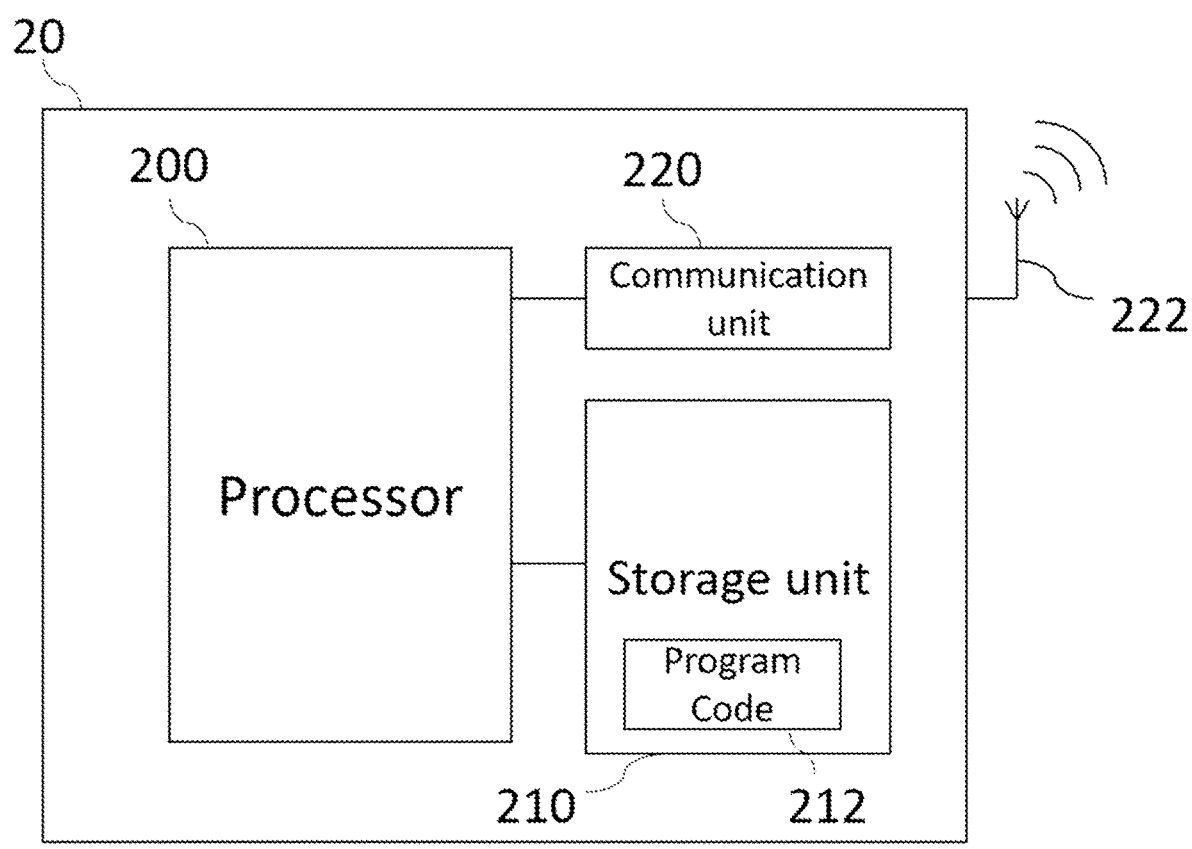
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 210 include but are not limited to a subscriber identity module (SIM), read-only memory (ROM), flash memory, random-access memory (RAM), hard-disk, and optical data storage device. The communication unit 220 may be a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
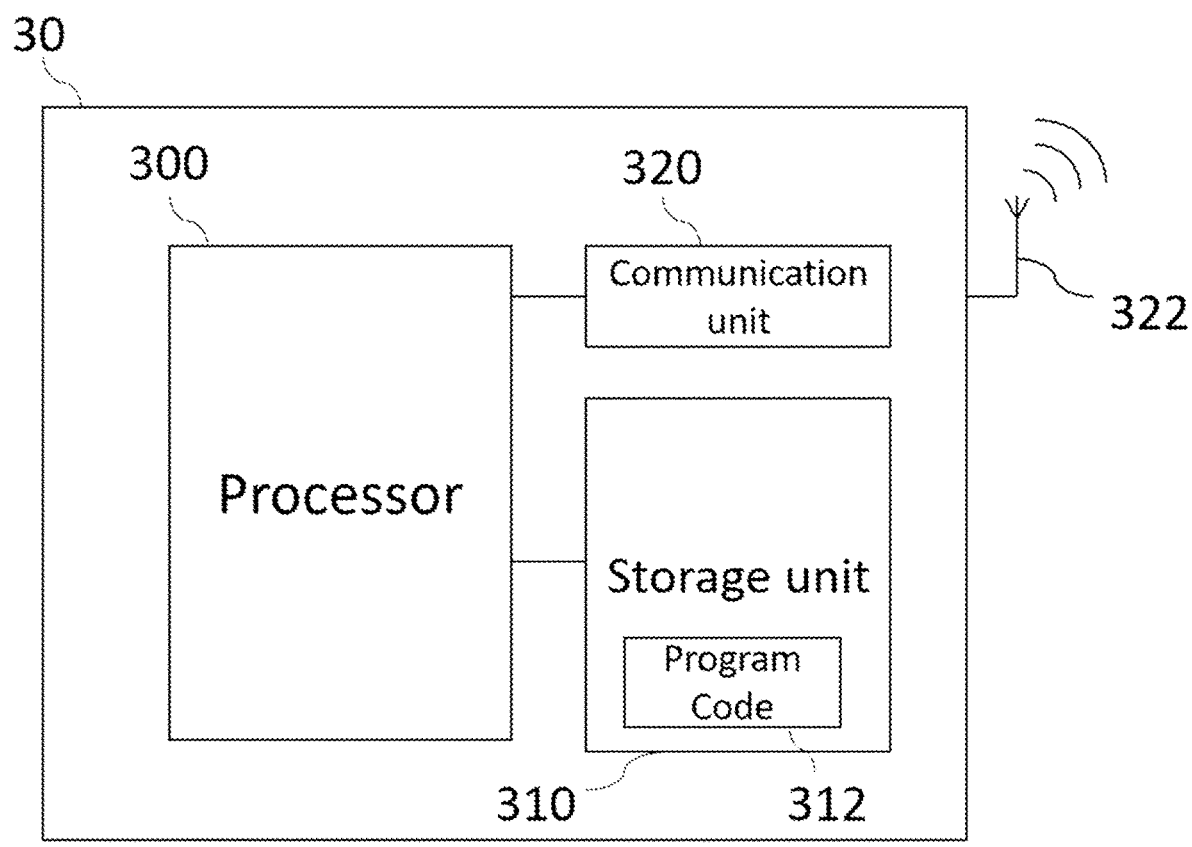
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 310 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In general, according to an embodiment, the positioning measurements or position estimation may be transmitted (e.g. reported) in physical channel(s) (e.g. physical uplink control channel (PUCCH) and/or physical uplink shared channel (PUSCH)) in order to overcome one or more of the above-mentioned problems of the prior art.

Embodiment 1

According to an embodiment, the positioning state information (PSI) report may be transmitted on PUCCH. That is, at least one of the following position estimation may be reported in PSI report on PUCCH: (a degree of) a latitude of UE, (a degree of) a longitude of UE, an altitude of UE, an uncertainty region of UE position, a confidence level of uncertainty region, a relative position, e.g. coordinates of UE relative to a reference point, a horizontal velocity, a vertical velocity and an uncertainty of velocity of the UE (e.g. associated with the horizontal velocity and/or the vertical velocity).

According to an embodiment, by reporting the PSI including the position estimation on the PUCCH, the position of UE can be reported periodically with low latency. Furthermore, the PUCCH is more reliable than other channels because of its small payload.

Embodiment 2

According to an embodiment, the PSI report may be transmitted on PUSCH. That is, the UE may be configured to report position estimation and/or measurement results on PUSCH.

The position estimation may refer to at least one of the following position and velocity information::(a degree of) a latitude of UE, (a degree of) a longitude of UE, an altitude of UE, an uncertainty region of UE position, a confidence level of uncertainty region, a relative position, e.g. coordinates of UE relative to a reference point, a horizontal velocity, a vertical velocity and an uncertainty of velocity.

The measurement results may refer to at least one of the following information: main measurement information, and additional measurement information. In an embodiment, multiple DL PRS resources may be configured per positioning node and the network may require UE to report one or more than one additional measurement based on different DL PRS resources.

The main measurement information may comprise at least one of the following information: positioning node identification (ID) information; RS index used for the measurement; a time stamp for the measurement; positioning measurement information (e.g. DL PRS reference signal received power (RSRP), DL reference signal time difference (RSTD) and UE reception-transmission (Rx-Tx) time difference); a measurement quality (e.g. the measurement may be acquired from multiple receptions, so the measurement quality may include the mean value of the measurements, the standard deviation of the measurements and the confidence level of the measurements); additional path information (e.g. the UE may be required to report certain path time in addition to first detected path time on receiving DL PRS, wherein the measurement quality for additional path may also need to be reported); and UE reception beam information (e.g. beam information of receiving the RS for measurement).

The additional measurement information may comprise RS index (of the RS) used for the measurement, time stamp for the measurement, measurement quality, additional path information, UE reception beam information may also need to be reported in the additional measurement information.

The definitions of DL PRS RSRP, DL RSTD and UE Rx-Tx time difference are as follows:

DL PRS reference signal received power (DL PRS-RSRP), is defined as the linear average over the power contributions (in [W]) of the resource elements that carry DL PRS reference signals configured for RSRP measurements within the considered measurement frequency bandwidth.

DL reference signal time difference (DL RSTD) is the DL relative timing difference between the positioning node j and the reference positioning node i, defined as TSubframeRxj−TSubframeRxi, wherein TSubframeRxj is the time when the UE receives the start of one subframe from positioning node j and TSubframeRxi is the time when the UE receives the corresponding start of one subframe from positioning node i that is closest in time to the subframe received from positioning node j. Multiple DL PRS resources can be used to determine the start of one subframe from a positioning node.

The UE Rx-Tx time difference is defined as TUE-RX-TUE-TX, wherein TUE-RX is the UE received timing of downlink subframe #i from a positioning node, defined by the first detected path in time and TUE-TX is the UE transmit timing of uplink subframe #j that is closest in time to the subframe #i received from the positioning node. Multiple DL PRS resources can be used to determine the start of one subframe of the first arrival path of the positioning node.

According to an embodiment, by transmitting the PSI in the PUSCH, PSI feedback can be triggered once needed (e.g. the PUSCH can be triggered dynamically). In addition, because the PUSCH equips with large payload, the network can require UE to report position estimation or measurement results in the PUSCH.

Embodiment 3

According to an embodiment, the PSI report may be divided into two-parts. That is, one PSI report can be divided into two parts, wherein the bit width of the first part is fixed once configured by higher layer signaling, and the bit width of the second part is indicated by the first part.

According to an embodiment, the first part of the PSI report may have at least one of the following contents: indication of the number of reported positioning nodes or the number of reported pairs of positioning nodes for DL RSTD measurements; indication of the number of reported additional paths or whether additional path is reported or not; indication of the number of additional measurements or whether additional measurement is reported in second part or not; indication of whether measurement quality is reported or not; indication of whether time stamp is reported or not; and indication of whether UE reception beam information is reported or not.

According to an embodiment, the second part of the PSI report may have at least one of the following contents as indicated by the first part: certain information of the main measurement and/or certain information of the additional measurement(s).

According to an embodiment, the second part of PSI report can be divided into one or more sub-parts, e.g. a first sub-part for the main measurement, a second sub-part for a first additional measurement, a third sub-part for second additional measurement, and so on.

Embodiment 3-1

According to an embodiment, a two-part PSI report for DL PRS RSRP measurement may comprise a first part of PSI report with at least one of the following contents: the number of reported positioning nodes is 3; additional measurement is not reported; time stamp is not reported; measurement quality is reported; and UE reception beam information is not reported.

In this embodiment, the PSI report for DL PRS RSRP measurement may comprise a second part of PSI report with the following contents:

positioning node ID information of first positioning node; DL PRS RSRP value; DL PRS index used for the measurement; and measurement quality of DL PRS RSRP;

positioning node ID information of second positioning node; DL PRS RSRP value; DL PRS index used for the measurement; measurement quality of DL PRS RSRP; and positioning node ID information of third positioning node; DL PRS RSRP value; DL PRS index used for the measurement; measurement quality of DL PRS RSRP.

Embodiment 3-2

According to an embodiment, a PSI report for DL RSTD measurement may comprise a first part of PSI report with at least one of the following contents: the number of reported pairs of positioning node is 2; the number of additional measurements is 2; time stamp is not reported; measurement quality is not reported; and the number of additional paths is 2.

In this embodiment, the PSI report for DL RSTD measurement may comprise a second part of PSI report with the following contents:

a first sub-part comprising at least one of the following contents:

main measurement of first pair with at least one of the following information:

reference positioning node ID information of first pair; neighbor positioning node ID information of first pair; DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node; and main measurement of second pair with at least one of the following information:

reference positioning node ID information of second pair; neighbor positioning node ID information of second pair; DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node.

a second sub-part comprising at least one of the following contents:

first additional measurement of first pair with at least one of the following information (where reference positioning node ID information and neighbor positioning node ID information associated for the measurement are the same as main measurement of first pair):

DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node; and first additional measurement of second pair with at least one of the following information (where reference positioning node ID information and neighbor positioning node ID information associated for the measurement are the same as main measurement of second pair):

DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node.

a third sub-part comprising at least one of the following contents:

second additional measurement of first pair with at least one of the following information (where reference positioning node ID information and neighbor positioning node ID information associated for the measurement are the same as main measurement of first pair):

DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node; and second additional measurement of second pair with at least one of the following information (where reference positioning node ID information and neighbor positioning node ID information associated for the measurement are the same as main measurement of second pair):

DL RSTD value; DL PRS index from reference positioning node used for the measurement; DL PRS index from neighbor positioning node used for the measurement; first additional path time of reference positioning node; second additional path time of reference positioning node; first additional path time of neighbor positioning node; and second additional path time of neighbor positioning node.

In an embodiment, the second part of PSI report may be divided into more sub-parts, e.g. three sub-parts, wherein the first sub-part for main measurement, the second sub-part for first additional measurement, the third sub-part for second additional measurement.

According to an embodiment, by adopting the two-part PSI report for reporting the PSI, the report content can be decided by UE (which is indicated in first part PSI). In addition, the UE can report some additional path information for achieving more accurate positioning. Furthermore, the UE can report some additional measurements, which allows the network to decide which measurement can be used for positioning the UE. Last but not the least, different parts of the PSI report can be mapped on PUSCH with different orders, e.g. the most important part can be mapped on most significant bits.

Embodiment 4

According to an embodiment, the PSI report processing may be given priority. That is, if the PSI (report) and channel state information (CSI) (report) are triggered by the same signaling, the UE may be indicated to only process PSI (e.g. prioritize the PSI (report)).

In an embodiment, once semi-persistent PSI or aperiodic PSI report is triggered, the UE may be indicated to stop the processing of all other on-going CSI reports.

In an embodiment, the occupation of UE calculation resources may depend on configuration of the PSI report. For example, the total number of positioning nodes and total number of DL PRS resources configured for deriving the PSI report.

In an embodiment, the configuration of PSI report may exceed the UE processing capability. In such a case, the UE may choose to report some positioning nodes indicated with high priority and/or the UE may choose some DL PRS resources indicated with high priority.

According to an embodiment, the PSI report feedback may be given priority. That is, some CSI reports and PSI report are multiplexed on the same physical channel, the PSI report can be indicated with highest priority.

In an embodiment, for two-part PSI report, a PSI report is mapped on PUSCH according to the following order:

the mapping priority from high priority to low priority is first part PSI, first sub-part in second part PSI, second sub-part in second part PSI, third sub-part in second part PSI . . . .

In an embodiment, for two-part PSI report, if the payload of PUSCH is not enough for the entire PSI report, the UE may omit a part of second part of the PSI report (i.e. at least one sub-part may be omitted). In an embodiment, the sub-part with lower mapping priority would be omitted first. That is, the second part of the PSI report may be omitted in an ascending order from the last sub-part to the first sub-part.

For example, the second part of PSI report comprises 3 sub-parts. The third sub-part in the second part of PSI report will be omit firstly, then the second sub-part in second part of PSI report, finally the first sub-part in second part of PSI report.

In an embodiment, the priority of the PSI can be higher than CSI when there is emergency positioning requirement.

Based on the Embodiment 4, the UE can process the PSI reports according to their priority, which can ensure more precise measurements by using limited UE capability.

Embodiment 5

Figure 4:
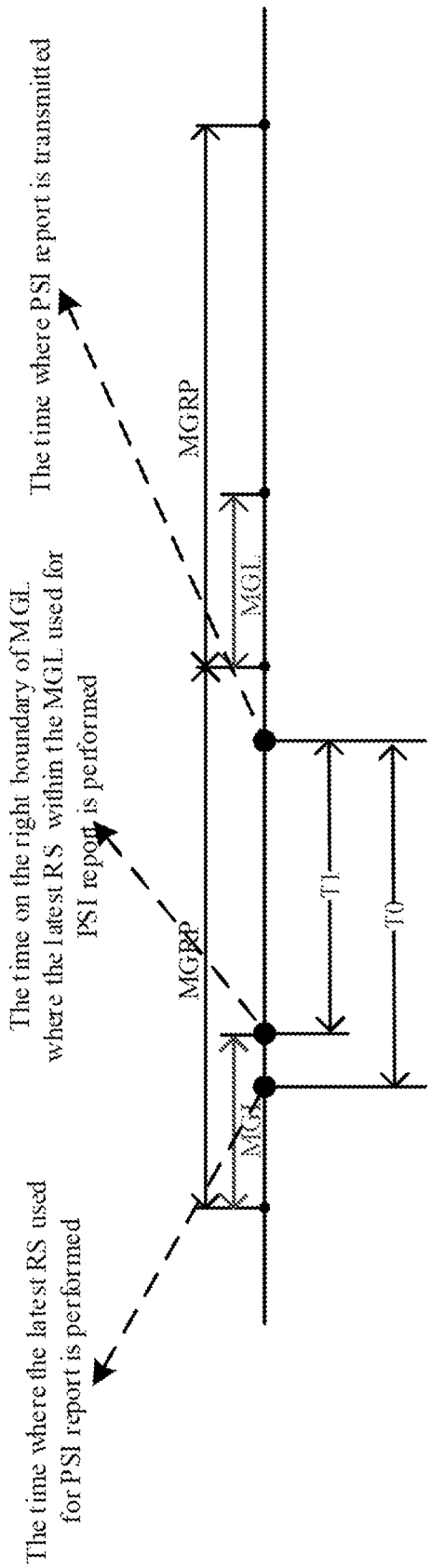
FIG. 4 illustrates a usage of the time gap for preparing the positioning state information report according to an embodiment of the present disclosure.

FIG. 4 illustrates a usage of the time gap for preparing the PSI report according to an embodiment of the present disclosure.

In an embodiment, since the bandwidth/center frequency/SCS (subcarrier spacing) of DL PRSs may be different from serving cell, the DL PRSs may only be received by the UE within a measurement gap. The network configures a measurement gap pattern, the measurement gap length is represented by MGL and the periodicity is represented by MGRP (measurement gap repetition period). In this embodiment, the time of transmitting PSI report may take the measurement gap configuration into considerations.

In an embodiment, the time gap for preparing the PSI report may satisfy one of the following conditions: the time gap T0 may not be less than a predetermined threshold, and/or the time gap T1 may not be less than a predetermined threshold. Note that the time gap T0 is the time gap between the time of receiving the last RS used for the PSI report and the time of transmitting the PSI report and the time gap T1 is the time gap between the end time of the measurement gap in which the last RS used for the PSI report is located and the time of transmitting the TSI report.

The threshold may be determined according to the UE capability, and it may be up to UE's capability to choose one of the above two options.

In an embodiment, the limitation associated with the time gap T0 may be adopted when the UE is able to process RS within measurement gap.

In an embodiment, the limitation associated with the time gap T1 may be adopted when UE can only buffer RS(s) received within measurement gap.

Based on UE capability, the UE can select the limitation associated with one of the time gaps T0 or T1 for preparing the PSI report.

In general, according to an embodiment, when the measurement of UE Rx-Tx time difference is required, the DL RS and UL RS used for the measurement can be considered to be activated by the same MAC CE and/or triggered by the same DCI. Because measurement of the UE Rx-Tx time difference needs recording the DL RS reception time and UL RS transmission time, the UE Rx-Tx time difference would be more accurate if the DL RS and UL RS are as close as possible.

FIG. 5 shows a flowchart of a process according to an embodiment of the present disclosure. The process shown in FIG. 5 may be used in a wireless terminal (e.g. UE) and comprises the following step:

Step 500: Transmit, to a wireless network node, positioning state information in a physical uplink channel.

In the process shown in FIG. 5, the wireless terminal transmits PSI to a wireless network node (e.g. BS). Note that the PSI is transmitted in a physical uplink channel.

In an embodiment, the physical uplink channel comprises at least one of a PUCCH or a PUSCH and the PSI comprises at least one of:

a latitude of the wireless terminal,
a longitude of the wireless terminal,
an altitude of the wireless terminal,
an uncertainty region of the wireless terminal,
a confidence level of the uncertainty region,
a relative position between the wireless terminal and a reference point,
a horizontal velocity of the wireless terminal,
a vertical velocity of the wireless terminal, or
an uncertainty of a velocity (e.g. (associated with) the horizontal velocity and/or the vertical velocity) of the wireless terminal.

In an embodiment, the physical uplink channel comprises a PUSCH and positioning state information comprises a PSI report comprising measurement results.

In an embodiment, the measurement results are associated with at least one of:

a main positioning measurement, or
at least one additional positioning measurement.

In an embodiment, the measurement results associated with the main positioning measurement or the at least one additional positioning measurement comprises at least one of:

positioning node identification information, associated at least one position node of the corresponding positioning measurement, reference signal index information, associated with at least one reference signal used for the corresponding positioning measurement, a time stamp of the corresponding positioning measurement, positioning measurement information, comprising at least one of a DL PRS-RSRP, a DL RSTD, or a UE Rx-Tx time difference, a measurement quality of the corresponding positioning measurement, additional path information, associated with at least one additional path of receiving the at least one reference signal used for the corresponding positioning measurement, or beam information, associated with at least one beam of receiving the at least one reference signal used for the corresponding positioning measurement.

In an embodiment, the positioning state information report comprises:

a first part, with a fixed bit width and comprising an indication of report contents comprised in the PSI report, and a second part, comprising at least one sub-part in which the measurement results of at least one of the main positioning measurement or at least one additional positioning measurement are comprised.

In an embodiment, the indication of the report contents comprises at least one of:

the number of position nodes associated with the positioning state information report, the number of additional paths associated with the positioning state information report, the number of the at least one additional measurement, an indication of whether the positioning state information report comprises measurement quality, an indication of whether the positioning state information report comprises a time stamp associated with the positioning state information report, or an indication of whether the positioning state information report comprises reception beam information.

In an embodiment, the wireless terminal receives a signaling of triggering reporting the PSI. In such a case, the wireless terminal stops or deprioritizes processing CSI.

In an embodiment, the wireless terminal configures processing resources of the wireless terminal based on a configuration of reporting the PSI (report). For example, the configuration comprises at least one of the number of positioning nodes associated with reporting the PSI (report) or the number of positioning reference signals associated with reporting the PSI (report).

In an embodiment, the positioning state information is associated with at least one positioning node and the wireless terminal processes the PSI associated with a part of the at least one positioning node based on priority of each positioning node, e.g., when the configuration of PSI (report) is beyond UE's capability.

In an embodiment, the positioning state information is associated with at least one reference signal and the wireless terminal processes the PSI associated with a part of the at least one reference signal based on priority of each reference signal, e.g., when the configuration of PSI (report) is beyond UE's capability.

In an embodiment, the PSI and CSI are configured in the same channel and the wireless terminal prioritizes the PSI.

In an embodiment, the positioning state information comprises a positioning state information report comprising a first part and a second part which comprises at least one sub-part, and a mapping priority of the first part and the at least one sub-part from high priority to low priority is the first part followed by the first sub-part in the at least one sub-part to the last sub-part in the at least one sub-part.

In an embodiment, the positioning state information comprises a positioning state information report comprising a first part and a second part which comprises at least one sub-part, and at least one of the at least one sub-part is omitted in an ascending order from the last sub-part in the at least one sub-part to the first sub-part in the at least one sub-part. In other words, the omitting at least one of the at least one sub-part is done in the ascending order from the last sub-part in the at least one sub-part to the first sub-part in the at least one sub-part.

In an embodiment, a time gap (e.g. T0 or T1 shown in FIG. 4) between a first time and a second time of transmitting the positioning state information is greater than a threshold. In this embodiment, the first time is one of a reception time of receiving the last reference signal associated with the positioning state information or an end time of a measurement gap in which the last reference signal associated with the positioning state information is received.

In an embodiment, at least one downlink reference signal and at least one uplink reference signal used for measuring a UE Rx-Tx time difference in the PSI is activated by the same MAC CE or triggered by the same DCI.

FIG. 6 shows a flowchart of a process according to an embodiment of the present disclosure. The process shown in FIG. 6 may be used in a wireless network node (e.g. BS) and comprises the following step:

Step 600: Receive, from a wireless terminal, positioning state information in a physical uplink channel.

In the process shown in FIG. 6, the wireless network node receives PSI from a wireless terminal (e.g. UE) in a physical uplink channel.

In an embodiment, the physical uplink channel comprises at least one of a PUCCH or a PUSCH and the PSI comprises at least one of:

a latitude of the wireless terminal, a longitude of the wireless terminal, an altitude of the wireless terminal, an uncertainty region of the wireless terminal, a confidence level of the uncertainty region, a relative position between the wireless terminal and a reference point, a horizontal velocity of the wireless terminal, a vertical velocity of the wireless terminal, or an uncertainty of a velocity (e.g. (associated with) the horizontal velocity and/or the vertical velocity) of the wireless terminal.

In an embodiment, the physical uplink channel comprises a PUSCH and positioning state information comprises a PSI report comprising measurement results.

In an embodiment, the measurement results are associated with at least one of:

a main positioning measurement, or at least one additional positioning measurement.

In an embodiment, the measurement results associated with the main positioning measurement or the at least one additional positioning measurement comprises at least one of:

positioning node identification information, associated at least one position node of the corresponding positioning measurement, reference signal index information, associated with at least one reference signal used for the corresponding positioning measurement, a time stamp of the corresponding positioning measurement, positioning measurement information, comprising at least one of a DL PRS-RSRP, a DL RSTD, or a UE Rx-Tx time difference, a measurement quality of the corresponding positioning measurement, additional path information, associated with at least one additional path of receiving the at least one reference signal used for the corresponding positioning measurement, or beam information, associated with at least one beam of receiving the at least one reference signal used for the corresponding positioning measurement.

In an embodiment, the positioning state information report comprises:

a first part, with a fixed bit width and comprising an indication of report contents comprised in the PSI report, and a second part, comprising at least one sub-part in which the measurement results of at least one of the main positioning measurement or at least one additional positioning measurement are comprised.

In an embodiment, the indication of the report contents comprises at least one of:

the number of position nodes associated with the positioning state information report, the number of additional paths associated with the positioning state information report, the number of the at least one additional measurement, an indication of whether the positioning state information report comprises measurement quality, an indication of whether the positioning state information report comprises a time stamp associated with the positioning state information report, or an indication of whether the positioning state information report comprises reception beam information.

In an embodiment, a time gap (e.g. T0 or T1 shown in FIG. 4) between a first time and a second time of transmitting the positioning state information is greater than a threshold. In this embodiment, the first time is one of a reception time of receiving the last reference signal associated with the positioning state information or an end time of a measurement gap in which the last reference signal associated with the positioning state information is received.

In an embodiment, at least one downlink reference signal and at least one uplink reference signal used for measuring a UE Rx-Tx time difference in the PSI is activated by the same MAC CE or triggered by the same DCI.

In summary, as apparent from the foregoing description, embodiments comprise one or more of the following aspects: report contents on PUCCH and PUSCH; two-part PSI design; priority issues (including the processing priority and feedback priority); and how to determine the time gap for preparing the PSI report.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
    transmitting, to a wireless network node, positioning state information in a physical uplink channel,
    wherein the positioning state information comprises a positioning state information report comprising measurement results, and
    wherein the positioning state information report comprises:
        a first part, with a fixed bit width and comprising an indication of report contents comprised in the positioning state information report, and
        a second part, comprising at least one sub-part in which the measurement results of at least one of a main positioning measurement or at least one additional positioning measurement are comprised.

2. The wireless communication method of claim 1, wherein the physical uplink channel comprises at least one of a physical uplink control channel or a physical uplink shared channel, and wherein the positioning state information comprises at least one of:
    a latitude of the wireless terminal,
    a longitude of the wireless terminal,
    an altitude of the wireless terminal,
    an uncertainty region of the wireless terminal,
    a confidence level of the uncertainty region,
    a relative position between the wireless terminal and a reference point,
    a horizontal velocity of the wireless terminal,
    a vertical velocity of the wireless terminal, or
    an uncertainty of a velocity associated with at least one of the horizontal velocity or the vertical velocity.

3. The wireless communication method of claim 1, wherein the physical uplink channel comprises a physical uplink shared channel.

4. The wireless communication method of claim 3, wherein the measurement results are associated with at least one of:
    the main positioning measurement, or
    at least one additional positioning measurement.

5. The wireless communication method of claim 3, wherein the measurement results associated with the main positioning measurement or the at least one additional positioning measurement comprises at least one of:
    positioning node identification information, associated at least one position node of the corresponding positioning measurement, p1 reference signal index information, associated with at least one reference signal used for the corresponding positioning measurement,
    a time stamp of the corresponding positioning measurement,
    positioning measurement information, comprising at least one of a downlink positioning reference signal reference signal received power, a downlink reference signal time difference, or a user equipment reception-transmission time difference,
    a measurement quality of the corresponding positioning measurement,
    additional path information, associated with at least one additional path of receiving the at least one reference signal used for the corresponding positioning measurement, or
    beam information, associated with at least one beam of receiving the at least one reference signal used for the corresponding positioning measurement.

6. The wireless communication method of claim 3, wherein the indication of the report contents comprises at least one of:
    the number of position nodes associated with the positioning state information report,
    the number of additional paths associated with the positioning state information report,
    the number of the at least one additional measurement,
    an indication of whether the positioning state information report comprises measurement quality,
    an indication of whether the positioning state information report comprises a time stamp associated with the positioning state information report, or
    an indication of whether the positioning state information report comprises reception beam information.

7. The wireless communication method of claim 1, further comprising:
    receiving, from the wireless network node, a signaling of triggering reporting the positioning state information, and stopping or deprioritizing processing channel state information.

8. The wireless communication method of claim 1, further comprising:
configuring processing resources of the wireless terminal based on a configuration of reporting the positioning state information,
wherein the configuration comprises at least one of the number of positioning nodes associated with reporting the positioning state information or the number of positioning reference signals associated with reporting the positioning state information.

9. The wireless communication method of claim 1, wherein the positioning state information is associated with at least one positioning node or wherein the positioning state information is associated with at least one reference signal, wherein the wireless communication method further comprises:
processing the positioning state information associated with a part of the at least one positioning node based on priority of each positioning node.

10. The wireless communication method of claim 1, wherein the positioning state information and channel state information are configured in the same channel, and
wherein the position state information is prioritized.

11. The wireless communication method of claim 1, wherein the positioning state information comprises a positioning state information report comprising a first part and a second part which comprises at least one sub-part, and
wherein a mapping priority of the first part and the at least one sub-part from high priority to low priority is the first part followed by the first sub-part in the at least one sub-part to the last sub-part in the at least one sub-part,
or wherein at least one of the at least one sub-part is omitted in an ascending order from the last sub-part in the at least one sub-part to the first sub-part in the at least one sub-part.

12. The wireless communication method of claim 1, wherein a time gap between a first time and a second time of transmitting the positioning state information is greater than a threshold, and
wherein the first time is one of a reception time of receiving the last reference signal associated with the positioning state information or an end time of a measurement gap in which the last reference signal associated with the positioning state information is received,
and wherein at least one downlink reference signal and at least one uplink reference signal used for measuring a user equipment reception-transmission time difference in the positioning state information is activated by the same media access control control element or triggered by the same downlink control information.

13. A wireless communication method for use in a wireless network node, the wireless communication method comprising:
receiving, from a wireless terminal, positioning state information in a physical uplink channel,
wherein the positioning state information comprises a positioning state information report comprising measurement results, and
wherein the positioning state information report comprises:
a first part, with a fixed bit width and comprising an indication of report contents comprised in the positioning state information report, and
a second part, comprising at least one sub-part in which the measurement results of at least one of a main positioning measurement or at least one additional positioning measurement are comprised.

14. The wireless communication method of claim 13, wherein the physical uplink channel comprises at least one of a physical uplink control channel or a physical uplink shared channel, and wherein the positioning state information comprises at least one of:
a latitude of the wireless terminal,
a longitude of the wireless terminal,
an altitude of the wireless terminal,
an uncertainty region of the wireless terminal,
a confidence level of the uncertainty region,
a relative position between the wireless terminal and a reference point,
a horizontal velocity of the wireless terminal,
a vertical velocity of the wireless terminal, or
an uncertainty of a velocity associated with at least one of the horizontal velocity or the vertical velocity.

15. The wireless communication method of claim 13, wherein the physical uplink channel comprises a physical uplink shared channel, and wherein the measurement results are associated with at least one of:
the main positioning measurement, or
at least one additional positioning measurement.

16. The wireless communication method of claim 15, wherein the measurement results associated with the main positioning measurement or the at least one additional positioning measurement comprises at least one of:
positioning node identification information, associated at least one position node of the corresponding positioning measurement,
reference signal index information, associated with at least one reference signal used for the corresponding positioning measurement,
a time stamp of the corresponding positioning measurement,
positioning measurement information, comprising at least one of a downlink positioning reference signal reference signal received power, a downlink reference signal time difference, or a user equipment reception-transmission time difference,
a measurement quality of the corresponding positioning measurement,
additional path information, associated with at least one additional path of receiving the at least one reference signal used for the corresponding positioning measurement, or
beam information, associated with at least one beam of receiving the at least one reference signal used for the corresponding positioning measurement.

17. The wireless communication method of claim 15, wherein the indication of the report contents comprises at least one of:
the number of position nodes associated with the positioning state information report,
the number of additional paths associated with the positioning state information report,
the number of the at least one additional measurement,
an indication of whether the positioning state information report comprises measurement quality,
an indication of whether the positioning state information report comprises a time stamp associated with the positioning state information report, or
an indication of whether the positioning state information report comprises reception beam information.

18. The wireless communication method of claim 13, wherein a time gap between a first time and a second time of transmitting the positioning state information is greater than a threshold, and wherein the first time is one of a reception time of receiving the last reference signal associated with the positioning state information or an end time of a measurement gap in which the last reference signal associated with the positioning state information is received, and wherein at least one downlink reference signal and at least one uplink reference signal used for measuring a user equipment reception-transmission time difference in the positioning state information is activated by the same media access control control element or triggered by the same downlink control information.

19. A wireless terminal, comprising:

a communication unit, configured to transmit, to a wireless network node, positioning state information in a physical uplink channel, wherein the positioning state information comprises a positioning state information report comprising measurement results, and wherein the positioning state information report comprises:

a first part, with a fixed bit width and comprising an indication of report contents comprised in the positioning state information report, and a second part, comprising at least one sub-part in which the measurement results of at least one of a main positioning measurement or at least one additional positioning measurement are comprised.

20. A wireless network node, comprising:

a communication unit, configured to receive, from a wireless terminal, positioning state information in a physical uplink channel, wherein the positioning state information comprises a positioning state information report comprising measurement results, and wherein the positioning state information report comprises:

a first part, with a fixed bit width and comprising an indication of report contents comprised in the positioning state information report, and a second part, comprising at least one sub-part in which the measurement results of at least one of a main positioning measurement or at least one additional positioning measurement are comprised.

\* \* \* \* \*